United States Patent
Eberle

(10) Patent No.: US 6,753,633 B1
(45) Date of Patent: Jun. 22, 2004

(54) CONSTRUCTION OF AN ELECTRICAL MACHINE WITH INDIVIDUAL POLE WINDINGS

(75) Inventor: Werner Eberle, Pforzheim (DE)

(73) Assignee: Kristina Wegerer, Karlsruhe (DE)

( * ) Notice: Subject to any disclaimer, the term of this patent is extended or adjusted under 35 U.S.C. 154(b) by 0 days.

(21) Appl. No.: 09/673,468
(22) PCT Filed: Feb. 17, 2000
(86) PCT No.: PCT/DE00/00447
§ 371 (c)(1), (2), (4) Date: Dec. 4, 2000
(87) PCT Pub. No.: WO00/49701
PCT Pub. Date: Aug. 24, 2000

(30) Foreign Application Priority Data

Feb. 17, 1999 (DE) .......................................... 199 06 484

(51) Int. Cl.⁷ ................................................ H02K 1/00
(52) U.S. Cl. ........................................ 310/216; 29/598
(58) Field of Search ................................ 310/216, 195, 310/269; 29/598

(56) References Cited

U.S. PATENT DOCUMENTS

| | | | | |
|---|---|---|---|---|
| 687,992 | A | * 12/1901 | Churchward | |
| 1,369,765 | A | * 3/1921 | Alexander | |
| 3,280,355 | A | * 10/1966 | Ruelle et al. | 310/269 |
| 3,307,059 | A | * 2/1967 | Kitano et al. | 310/216 |
| 4,264,836 | A | * 4/1981 | Dukshtau et al. | 310/216 |
| 4,456,842 | A | * 6/1984 | Tachibana | 310/61 |
| 4,489,249 | A | * 12/1984 | Olivier | 310/216 |
| 4,633,108 | A | 12/1986 | von der Heide | 310/12 |
| 4,712,035 | A | * 12/1987 | Forbes et al. | 29/596 |
| 4,835,839 | A | * 6/1989 | Forbes et al. | 29/596 |
| 4,942,324 | A | * 7/1990 | Ooyama et al. | 310/216 |
| 5,057,733 | A | 10/1991 | Sonoda et al. | 310/269 |
| 5,233,253 | A | 8/1993 | Nishio et al. | 310/254 |
| 5,801,463 | A | * 9/1998 | Suzuki et al. | 310/51 |
| 6,369,483 | B1 | * 4/2002 | Hill | 310/216 |
| 6,369,687 | B1 | * 4/2002 | Akita et al. | 310/216 |

FOREIGN PATENT DOCUMENTS

| | | | |
|---|---|---|---|
| DE | 1 181 312 | 12/1963 | |
| DE | 196 43 561 | 10/1996 | |
| DE | 297 23 597 | 11/1997 | |
| DE | 199 06 484 | 9/2000 | |
| FR | 2 519 204 | 7/1983 | |
| JP | 05 284677 | 10/1993 | |
| JP | 08 223898 | 8/1996 | |
| JP | 10145990 A | * 5/1998 | ............ H02K/1/18 |

* cited by examiner

Primary Examiner—Joseph Waks
(74) Attorney, Agent, or Firm—Collard & Roe, P.C.

(57) ABSTRACT

An electrical machine with a single-pole winding substantially built from bodies, whereby at least one of said bodies is structured from a number of segments at least corresponding with the number of poles of the electrical machine. At least one of the inductively excitable bodies of the electrical machine is substantially assembled from receiving bodies suitable for receiving at least two winding carriers in an operationally fixed manner. The receiving bodies are decoupled from the given pole number of pole pitch of the machine and can be dimensioned depending on the manufacturing tolerance.

17 Claims, 3 Drawing Sheets

CONSTRUCTION OF AN ELECTRICAL MACHINE WITH INDIVIDUAL POLE WINDINGS

CROSS REFERENCE TO RELATED APPLICATIONS

Applicants claim priority under 35 U.S.C. §119 of German Application No. 199 06 484.9 filed Feb. 17, 1999. Applicants also claim priority under 35 U.S.C. §371 of PCT/DE00/00447 filed Feb. 17, 2000. The international application under PCT article 21(2) was not published in English.

BACKGROUND

The invention relates to an electrical machine with a single-pole winding with a structure substantially comprising two bodies, whereby at least one of said bodies has a layered structure in the form of a laminated sheet-iron plate and at least one of said bodies is assembled in a segmented manner as a receiving body substantially comprising at least two carrier segments; whereby each of said carrier segments, which are structured layered on their own as well, is suitable for receiving in an operationally fixed manner at least two winding carriers in suitable cavities; and whereby said winding carriers each can be wound separately.

Such an electrical machine is known from DE-A 1 181 312. The layered and at the same time segmented structure of a machine body is expected to assure adequate venting of the electrical machine by making individual segments of such a laminated sheet plate shorter, so that additional venting channels are opened in this way.

An electrical machine that is structured in a similar way is known from German patent specification DE 196 43 561.

It is known since a long time in connection with electrical machines to make provision for single-pole windings for the purpose of avoiding overlapping of conductors in order to achieve a particularly compact winding. The problem in conjunction with such single-pole windings is that due to the constant width of the pole cores, which is desirable for making the flow density more uniform, an overall unsatisfactory groove filling factor is obtained as a consequence of the radially outwardly expanding grooves for receiving the windings.

Another problem of electrical machines is that in the event of a conductor fracture, either the rotor has to be replaced as a whole, or said component has to be completely newly rewound.

Therefore, for avoiding such drawbacks, an electrical machine is proposed in DE-PS 196 43 561 whose rotor has a structure substantially comprising two different types of segments. The one segment is a completely pre-wound, finished T-segment, which advantageously may be wound with the help of a machine, and the other segment is an X-segment. According to the instruction of said patent specification, the rotor or stator of an electrical machine can be manufactured in a simple way by plugging the respective segments together to obtain a rotor or a stator. In this connection, the pole segments are connected to each other by means of thin holding pins to obtain a rotor or a stator.

The advantage of this known solution lies in that it is possible to use pole segments that are already completely pre-wound and finished, and in particular wound with a machine. Such pole segments can be employed in conjunction with interior rotors, external rotors, or even in connection with axial-flow machines and linear motors.

However, in the course of practical realization of such an electrical machine it was found that it is difficult to assemble an armature or rotor from said pole segments. Because of the manufacturing tolerances achievable in connection with such components it was not possible to assemble a circular machine element. It was accordingly not possible to assemble the armature or rotor of an electrical machine from the pole segments described above.

Furthermore, it is not possible to simply reduce the number of the individual segment in order to facilitate the assembly because said number has a direct relation to the pole division or pole number desired in a given case for the respective electrical machine. Moreover, the aforementioned segmentation of a soft-magnetic body of the electrical machine leads to substantial variations in the width of the air gap, which is not acceptable especially in conjunction with electrical machines operating at high speeds. Furthermore, an air gap width varying beyond the periphery of the rotor leads to scatter loss impairing the efficiency, as well as to possible variations in the synchronism and output or the electrical machine.

Therefore, the invention is based on the problem to open up the widest possible field of application for the advantageous structure of an electrical machine comprising at least one body with a segmented structure.

SUMMARY

Said problem is solved with an electrical machine as defined in the introductory part of the independent claim in that the carrier segments of the electrical machine are manufactured in such a way that the winding carriers are equally well usable for linear motors and rotational machines. This permits a manufacture according to the modular principle. Furthermore, the winding carriers are secured in a detachable manner, so that individual winding carriers can be replaced in the event of a conductor fracture or other defects. Furthermore, the electrical machine can be fitted with winding carriers depending on the power density desired in the given case. The modular construction thus permits an exact adaptation to the installation space or the requirements in the given case, first of all, whereby the fitting of the machine, furthermore, can be exactly adapted to said parameters. The present machine accordingly can be varied in almost any desired way with nearly no change in its manufacture.

According to said solution as defined by the invention, a distinction is made between carrier segments for building up a receiving body and winding carriers by segments. A carrier segment as defined by the invention is in each case suitable for receiving a plurality of winding carriers, at least two winding carriers.

The carrier segments, in each case decoupled from the given pole pitch, can be dimensioned in this manner in such a way that they cover in each case more than one pole pitch of the electrical machine. In conjunction with rotating electrical machines it is thus possible to assemble the rotor or stator from two, four, six, eight or another selectable number of carrier segments. Said number, however, should be as low as possible for manufacturing reasons.

The selection of the number of carrier segments to be assembled in a given case is, in this connection, entirely independent of the pole number of the respective electrical machine because only up to a defined number of winding carriers—said number being determined by the size of the carrier segment—can be inserted in the carrier elements.

As opposed to the prior art, the deviations from the ideal measure in the dimensions of the individual components required for the assembly of the machine body, such deviations being unavoidable within the framework of the usual manufacturing tolerances, cannot add up in such a way that, as the final result, the machine body cannot be assembled. The number of carried segments used is for that purpose selected independently of the pole number of the machine and depending on the manufacturing accuracy and tolerances in a way such that the respective body of the electrical machine can be safely assembled.

Advantageous developments of the instruction as defined by the invention are specified according to the following dependent claims.

Owing to the fact that according to claim 2, each carrier segment by itself completely forms the respective cavities, an easier assembly of the machine is assured than if corresponding cavities were formed also between the segments.

The modular structure of the machine becomes even more efficient if the machine can be assembled from pre-fabricated laminated sheet-iron plates.

According to an advantageous development of the invention, the winding carriers are already completely wound before they are inserted in the respective receiving body. The winding carriers can be wound separately and with the help of machines in particular by employing the flyer technique.

The winding as such, but also the operationally fixed support of the windings is facilitated in that the winding carriers each have pronounced coil heads. Producing the winding carriers in the form of single-pole windings permits the formation of flat coil heads and thus extremely compact designs of machine construction.

The winding carriers can be connected with the respective receiving bodies in a simple manner by means of plug pins in a detachable and operationally fixed manner.

It may be necessary in conjunction with multiphase machines to arrange a plurality of separate windings on one single winding carrier. This, too, is substantially facilitated by the fact that the winding carriers can be pre-wound separately.

An embodiment of the winding carrier that is particularly advantageous with respect to both its manufacture and operation is specified according to claim 7.

Because of the special form of the winding carrier and the receiving body it is possible also with such a structure of the machine to form an at least nearly closed surface vis-a-vis the air gap. This assures uniform flow-through and thus the synchronism of the machine.

It is alternatively or additionally possible to secure each winding carrier by means of a projection that engages a corresponding guide groove of the receiving body.

A plurality of distinguishable windings can be advantageously arranged on the winding carrier.

According to a further development of the invention, the pole shanks are wound with a flat wire. As opposed to round wires such a flat-wire winding avoids the possible formation of cavities in the space of the grooves. The smooth-edged space of the groove, which preferably has a rectangular cross section, can be optimally filled in this way. A high groove filling factor increases the degree of efficiency of the respective electrical machine.

Owing to the fact that the receiving bodies each are structured as laminated sheet-iron plates in a way such that the individual layers are arranged offset, leaving free the cavity provided for receiving the completely wound, i.e. the finished pole shank of the winding carrier, the carrier segments are structured as a whole as laminated sheet-iron plates each having the highest density.

Avoiding additional air gaps between the adjacent carrier segments, the cogging achieved in this way substantially increases the possible flow through the respective electrical body because of the increased relative permeability constant $\mu_r$. Furthermore, the mechanical strength of the receiving body so cogged is increased.

According to a further improvement of said advantageous further development, the thickness of the laminated sheet plates employed for building up the receiving bodies can be freely selected depending on the machine output desired in the given case. The winding carriers to be pushed in remain unaffected thereof up to a certain limit.

A further increase of the efficiency of the electrical machine so structured is obtained in that the individual receiving bodies can be build up from grain-oriented transformer sheets, whereby the orientation is not lost even beyond the periphery of the electrical machine because of the segmented arrangement.

According to a further development of the invention it is possible within the framework of the latter to build up a compensated electrical machine by structuring the receiving body in a way such that receiving bodies can be pushed in on both sides, i.e. disposed both radially on the inside and radially on the outside, or disposed inside and outside in conjunction with linear motors.

Owing to the modular structure of the machine and the fact that it can be adapted at the same time in almost any desired way to the power density required in the given case it is possible to employ the machine anywhere where perfect adaptation to the available installation space is required. If it is designed in the form of a linear motor, for example, it can be mounted as a direct drive on a closed handling axle instead of attaching an additional linear motor next to the handling axle. A completely closed design offers many advantages especially in an aggressive environment.

According to claim 17, the electrical machine as defined by the invention can be advantageously employed both as a linear motor and a motor with an interior or external rotor. It is likewise possible also to build up synchronous, asynchronous, permanently excited or electronically commuted electric machines or direct drives. Furthermore, if the winding carrier is wired accordingly, the electrical machine as defined by the invention can be build up also in a simple way as a compensated motor.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION

Figure 1:
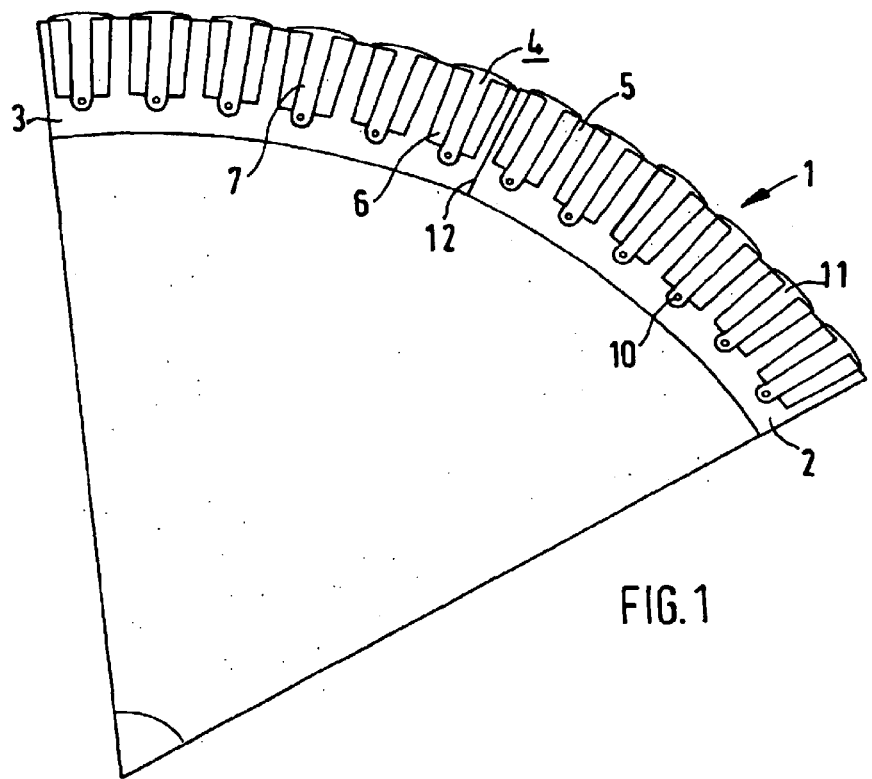
FIG. 1 shows by a cross sectional view a cutout of a rotational primary component of an electrical machine with two carrier segments for building up such a primary component.

FIG. 1 shows the cutout of a rotational primary component of an electrical machine. The cutout shows about 60° of a full circle of the primary component 1. Said range of the primary component 1 is substantially assembled from the two carrier segments 2 and 3, which each are suitable for receiving the winding carriers 4, which are already completely wound and finished. In the present exemplified embodiment, the two carrier segments 2 and 3 extend over a range of approximately 30°, so that the entire primary component can be assembled from 12 of such carrier segments 2 and 3.

The number of carrier segments 2 and 3 adding up to a complete, in the present case rotational primary component can be selected in any desired way irrespective of the desired pole pitch by dimensioning the carrier segments 2 and 3 accordingly. The carrier segments 2 and 3 are substantially build up from tooth-shaped, grain-oriented transformer sheets, whereby provision is made for the cavities 6 located between the individual teeth 5 of the transformer sheets for receiving the winding carriers 4. The winding carriers 4 are pushed with their punch-like pole shanks 7 into the cavities 6 in a way such that the cavity 6 remaining on both sides of the pole shanks 7 represents the groove for the respective single-pole windings.

Like the carrier segments 2 and 3, the pole shanks 7 have recesses for receiving the plug pins 10 that serve for connecting the winding carriers 4 with the respective carrier segment 2 or 3.

The pole shanks 7 are pre-wound by means of a machine. They are preferably provided with a flat wire winding produced by the flyer technique. Said winding encloses the pole shank 7 as completely as possible, on the one hand, and fills the remaining hollow space or cavity 6 as completely as possible. The flat wire winding proposed in the present exemplified embodiment is suited to optimally filling the respective hollow spaces 6.

The cavities 6 are finally sealed by the coil head 11 of the winding carrier 4. Within the framework of the invention it is possible also that the hollow spaces 6 are sealed by the coil heads 11 only partially, if necessary.

As mentioned before, the carrier segments 2 and 3 each are produced laminated from punched, grain-oriented thin transformer sheet material. It is possible also to employ laminated sheet plates that are already pre-layered. The carrier segments 2 or 3 each are build up in such a way that the aforementioned transformer plates are stacked up one on top of the other to form a laminated sheet plate, whereby the individual layers for building up the receiving bodies are arranged one on top of the other in such a way that each layer is offset versus the other by one pole pitch, so that a hollow space 4 remains left available in each case for receiving a winding carrier 4. By offsetting the individual layers of the plate, a cogging of the adjacent carrier segments 2, 3 is obtained in such a way that the abutting edges 12 present between the individual carrier segments 2 or 3 are cogged and almost completely closed. An overall superior flow of current through the soft-magnetic receiving body is achieved in this way.

Figure 2:
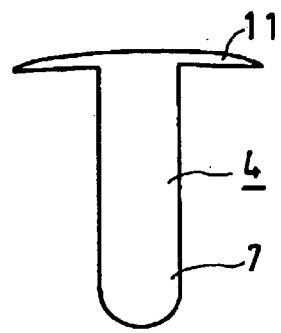
FIG. 2 is a view of a detail of a carrier segment with a winding carrier associated with said carrier segment.
Figure 2:
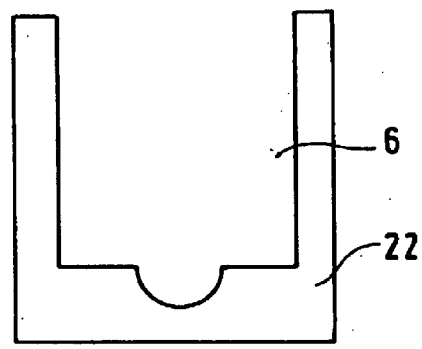

FIG. 2 shows by a detailed view the cutout of a carrier segment 22 for a linear motor that is suitable for receiving one single winding carrier 4. The carrier segment 22 has in each case the cavities 6 for receiving the pole shank 7 of the winding carrier 4. The winding carriers 4 are in this connection pushed into the cavity 6 in a way such that the pole shanks 7—which are provided with a flat wire winding in a way not shown here in detail—each are completely received in the hollow space 6. In a way also not here in greater detail, the winding carriers 4 each are connected with the respective carrier segment 22 in an operationally safe yet detachable way by means of a plug pin 10. The winding carrier 4 is mounted in conjunction with the carrier segment 22 in an analogous manner for building up rotational machine bodies.

Owing to the simple installation of the winding carriers 4 in the carrier segments 2 and 3, which is particularly obvious from FIG. 2, it is possible in case of a conductor fracture or some other damage to the insulation of the winding to simply replace the affected winding carriers 4 completely. Furthermore, by equipping the carrier segments 2 or 3 with winding carriers 4 accordingly it is possible to vary in a simple manner the pole pitch or the maximally available torque of the respective electrical machine.

Figure 3:
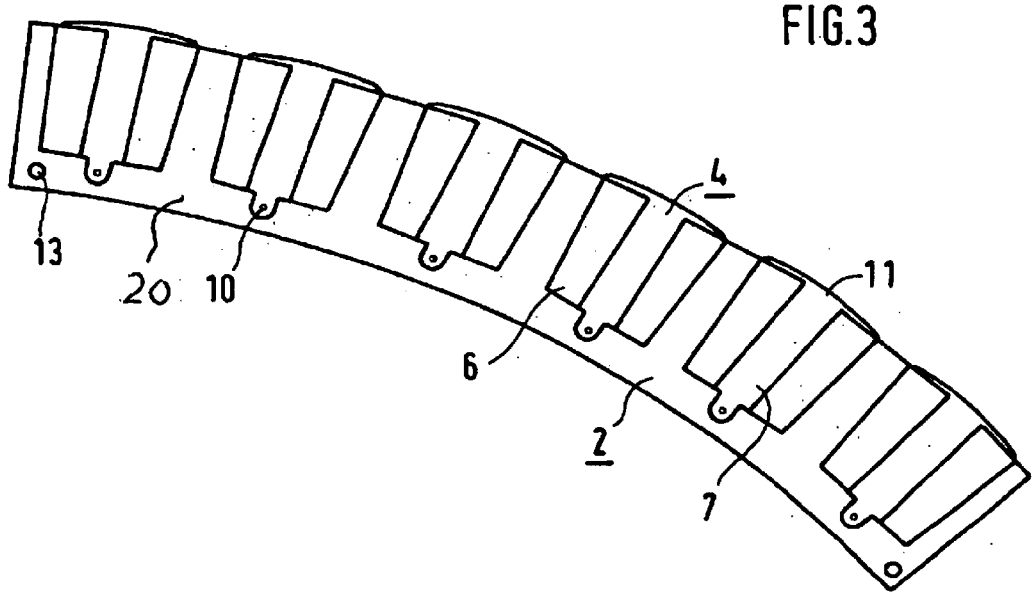
FIG. 3 shows a carrier segment with inserted winding carriers for a rotational primary component.

FIG. 3 shows a carrier segment with the inserted winding carriers 4. The winding carriers 4 are connected with the carrier segment 2 via the plug pins 10 in a detachable yet operationally safe manner. Within the yoke of the rotor on the inner circle of the carrier element 2, provision is made for the recesses 13 for receiving connecting pins not shown here in detail.

The carrier segments 2, 3 can be connected with each other by means of the recesses 13 and the aforementioned connecting pins for forming a rotational electrical receiving body.

Figure 4:
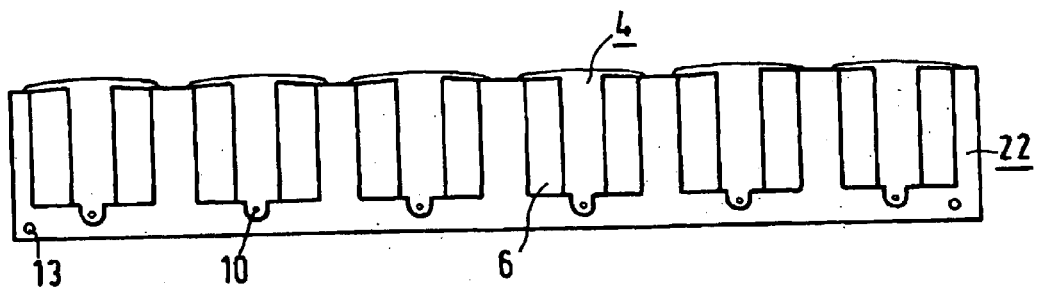
FIG. 4 shows a cross sectional view of a carrier segment with inserted winding carriers for a linear motor.
Figure 5:
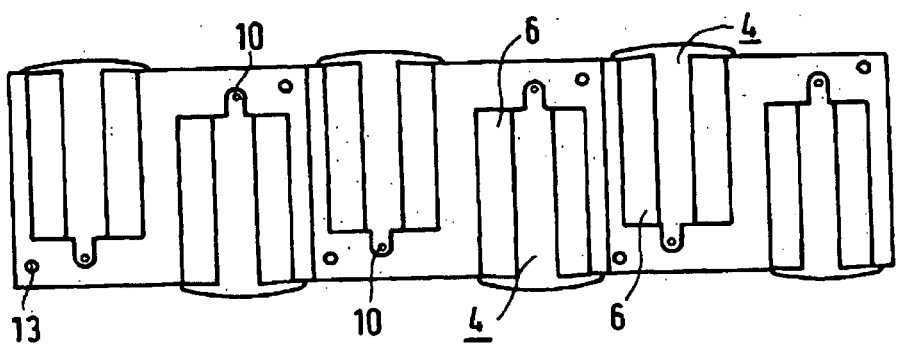
FIG. 5 shows a cross sectional view of a receiving body with inserted winding carriers for building up a compensated linear motor.

FIG. 4 shows the analogous structure of a carrier segment 22 for a linear motor. In the present case, too, provision is made within the zone of the yoke on the inner circle of the carrier segment 12, 3 for the recesses 13 for connecting pins for the connection with the adjacent carrier element and for building up the layered stack of sheets.

According to an alternative design of the carrier segments 2, 3 or 22, compensated electrical machines can be build up according to the instruction of the invention as well.

For said purpose, the carrier segments 22 each have on both sides, i.e. on the inner side and the outer side of the machine, the hollow spaces 6 for receiving the winding carriers 4. The winding carriers 4 inserted on the one side represent compensation windings versus the winding carriers 4 pushed in on the other side. An electrical motor that is compensated as desired can be build up in this way in a simple manner.

The electrical machine is more or less compensated depending on the way in which the segmented receiving body is outfitted.

In an analogous way it is possible also to produce a rotational electrical body for building up a corresponding rotational compensated electrical machine.

Figure 6:
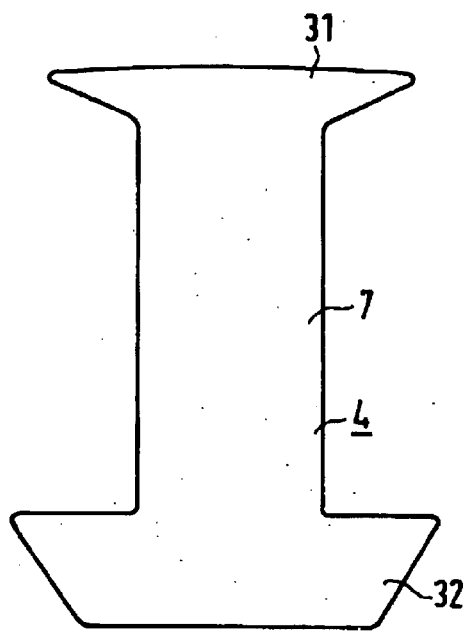
FIG. 6 shows a cross sectional view of a modified winding carrier.
Figure 7:
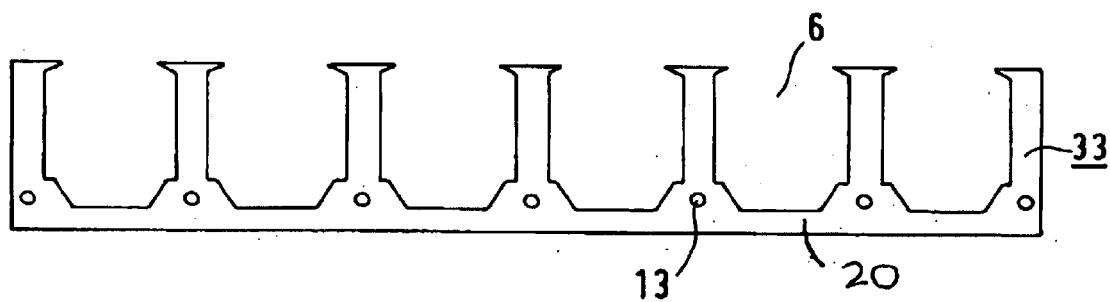
FIG. 7 is a cross sectional view of a correspondingly modified carrier segment for a linear motor.

FIG. 6 shows a modified embodiment of a winding carrier 4 in connection with which pole shank 7 has a largely rectangular profile whose transverse sides each are limited by a first equally legged trapezoidal element 31 and a second equally legged trapezoidal element 32, whereby first equally legged trapezoidal element 31 facing the air gap of the electrical machine forms the coil head, and second equally legged trapezoidal element 32 is facing the yoke of the carrier segment. The surface of the coil head facing the air gap may be designed in this connection with a cross section in the form of a circular segment whose curvature is dependent on the given circumference of the machine. A uniform expanse of the air gap is assured in this way in conjunction with the non-wound poles of the carrier segments.

Figure 8:
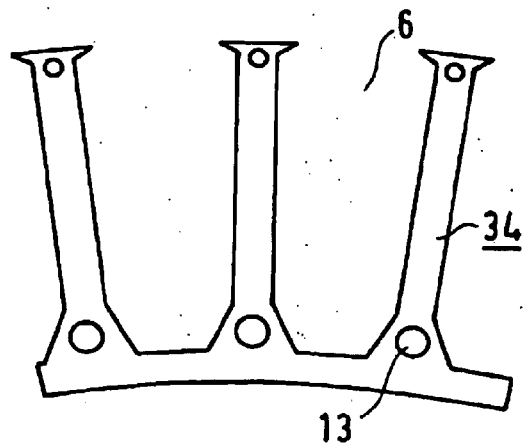
FIG. 8 is a cross sectional view of a correspondingly modified carrier segment for a rotational machine.

The winding carrier 4 can be identically employed for the carrier segment 33 of a linear motor according to FIG. 47 or for the carrier segment 34 of a rotational machine according to FIG. 8, whereby the basic profiles have to be adapted in each case in view of the circumference of the given machine.

An electrical machine is described according to the preceding exemplified embodiments whose armature or rotor or whose one electrical body can be built up in the case of a linear motor in a simple way by connecting the respective carrier segments 2, 3, 22, 33, 34 in the form of modules. The mechanically pre-wound winding carriers 4 can be inserted in a simple manner in said carrier segments 2, 3, 22, 33, 34 depending on the desired pole pitch, machine capacity or compensation effect. If any of the winding carriers 4 are damaged they can be replaced in a simple way. Owing to the fact that according to the instruction of the invention, the size of the individual carrier segments 2, 3, 22, 33 or 34 is in each case entirely independent of the desired pole pitch, the individual carrier segments 2, 3, 22, 33 or 34 can be produced with the usual manufacturing expenditure in a way such that a constant with a constant width or with the required tolerances is obtained.

Furthermore, it is possible by means of the segmentation of the respective electrical body of the electrical machine, which segmentation may have to be adapted, if need be, to safely assemble the desired electrical body without having to demand compliance with manufacturing accuracies not usually required to be met in the construction of electrical machines. Even a rotational armature or stator can manufactured and safely assembled by the advantageous segment construction described above in a simple way. The width of the air gap depending on the number of receiving bodies to be assembled remains adequately constant in this connection over the entire circumference of the electrical body.

Said segmented-type construction permits the construction of machines with different radii, fittings and torques with always the same winding carriers 4. The application spectrum for said winding carriers 4 and thus the pieces of units to be produced are substantially increased in this way.

This leads to a further reduction of the manufacturing costs. According to the exemplified embodiments described above, the winding carriers 4 can be used even both for linear and rotating electrical bodies.

This leads to a further widening of the application spectrum and results in the desired increase of the number of units to be produced as well, at least with respect to the manufacture of the winding carriers 4 described above.

List of Reference Numerals

1 Primary component
2 Receiving body
3 Receiving body
4 winding carrier
5 Tooth
6 Cavity
7 Pole shank
10 Plug pin
11 Coil head
12 Abutting edge
13 Recess
20 Yoke section of receiving body
22 Receiving body
31 Trapezoidal element on air gap side
32 Trapezoidal element on yoke side
33 Modified carrier segment for linear motor
34 Modified carrier segment for rotational machine

What is claimed is:

1. An device for use with either a rotational or a linear electrical machine having a substantially constant air gap between a movable section and a stationary section the movable section of the device comprising:

at least two carrier segments, each forming a single piece receiving body, wherein each carrier segment is laminated and independently structured, and each carrier segment comprises a yoke, a plurality of nonwound poles connected to each other via said yoke, and a plurality of cavities, wherein each cavity is defined by said yoke and two adjacent nonwound poles of each carrier segment; and at least two winding carriers which are each separately wound and which are each detachably secured in an integral manner in each of said plurality of cavities;

wherein when said two winding carriers are detachably secured in each of said plurality of cavities there is formed a substantially constant air gap between the movable section and the stationary section of the device.

2. The device according to claim 1, wherein said at least two winding carriers and said at least two carrier segments are built from sheet layers that are pre-configured in the form of laminated sheet plates, and wherein the device is at least partly assembled from the laminated sheet plates in the form of a module construction.

3. The device according to claim 1, wherein said at least two winding carriers are completely wound by a machine before they are mounted.

4. The device according to claim 3, further comprising a projection disposed on a surface of each winding carrier pointing at said yoke of said receiving body, and a corresponding guide groove in engagement with said projection, wherein said guide groove is disposed in a zone of said yoke of the receiving body in said operating condition.

5. The device according to claim 3, further comprising a plurality of distinguishable windings disposed at least on a part of each winding carrier.

6. The device according to claim 3, wherein each winding carrier comprises a flat wire winding.

7. The device according to claim 1, wherein said at least two winding carriers are each profiled bodies having a coil head and a pole shank.

8. The device according to claim 7, further comprising a first equally legged trapezoidal element and a second equally legged trapezoidal element that limit each longitudinal side of a profile of each winding carrier, and a substantially rectangular center component disposed between said first trapezoidal element and said second trapezoidal element, wherein said rectangular center component forms said pole shank.

9. The device according to claim 8, wherein said cavities have a profile suitable for receiving said trapezoidal elements and said pole shank in a form locked manner, wherein said first trapezoidal element points at said yoke of said receiving body in an operating condition and said second trapezoidal element faces away from said yoke and forms a coil head, and wherein surfaces of said adjacent non-wound poles of the receiving body jointly form a substantially closed surface pointing at an air gap of the electrical machine.

10. The device according to claim 1, further comprising plug pins that detachably connect said at least two winding carriers with the receiving body in an operationally rigid manner.

11. The device according to claim 1, wherein said at least two carrier segments structured from laminated sheet plates are designed in such a way that individual layers are arranged offset, leaving clear said cavities provided for receiving said at least two winding carriers, so that when viewed across a circumference or a length of the electrical machine, each individual layer of each carrier segment is structured in a segmented manner and segments of one layer are arranged offset from an adjacent layer by one pole pitch.

12. The device according to claim 11, wherein the number of sheet layers used for building said receiving bodies is freely selectable depending on the machine output required.

13. The device according to claim 11, wherein said at least two carrier segments are each built from layers of transformer sheets punched out in the foam of teeth, from grain-oriented sheet material.

14. The device according to claim 11, wherein said cavities are distributed over a periphery of said at least two carrier segments on a side facing an interior of the machine and on a side facing an exterior of the machine for receiving said at least two winding carriers for building a compensated electrical machine.

15. The device structured in a segmented manner according to claim 1 in a linear motor within a closed handling axle.

16. The device structured in a segmented manner according to claim 1, in a motor with an interior or exterior rotor, linear motor, synchronous or asynchronous machine, direct drive, permanently excited machine, or in an electronically commutated machine.

17. A device for use with either a rotational or a linear electrical machine having a substantially constant air gap between a movable section and a stationary section, the movable section of the device comprising;
- at least two carrier segments, each forming a one-piece receiving body, wherein each carrier segment is laminated and independently structured, and each carrier segment comprises a plurality of nonwound poles connected to each other, and a plurality of cavities wherein each cavity is defined by said two adjacent nonwound poles of each carrier segment; and
- at least two winding carriers which are each separately wound and which are each detachably secured in an integral manner in each of said plurality of cavities;
- wherein when said at least two winding carriers are detachably secured in each of said plurality of cavities there is formed a substantially constant air gap between the movable section and the stationary section of the device.

* * * * *